United States Patent [19]

Fritschi et al.

[11] 4,194,866

[45] Mar. 25, 1980

[54] SLIVER CAN TRANSPORTING DOLLY

[75] Inventors: Bruno Fritschi, Uster; Ludek Malina, Kloten, both of Switzerland; Max Oestreicher, Küssaburg, Fed. Rep. of Germany

[73] Assignee: Rieter Machine Works Ltd., Winterthur, Switzerland

[21] Appl. No.: 893,888

[22] Filed: Apr. 6, 1978

[30] Foreign Application Priority Data

Apr. 12, 1977 [CH] Switzerland ..................... 4478/77

[51] Int. Cl.² ............................................. B60P 1/30
[52] U.S. Cl. ..................................................... 414/459
[58] Field of Search ................................. 414/458–461

[56] References Cited

U.S. PATENT DOCUMENTS

| 1,202,948 | 10/1916 | Wollbrandt | 414/458 |
| 4,059,185 | 11/1977 | Weber | 198/339 |

*Primary Examiner*—Robert G. Sheridan
*Attorney, Agent, or Firm*—Werner W. Kleeman

[57] ABSTRACT

A sliver can transporting dolly comprising a base frame having substantially parallel longitudinal support beams and mechanism for laterally tilting, gripping underneath and lifting cans standing between the longitudinal support beams of the base frame.

8 Claims, 8 Drawing Figures

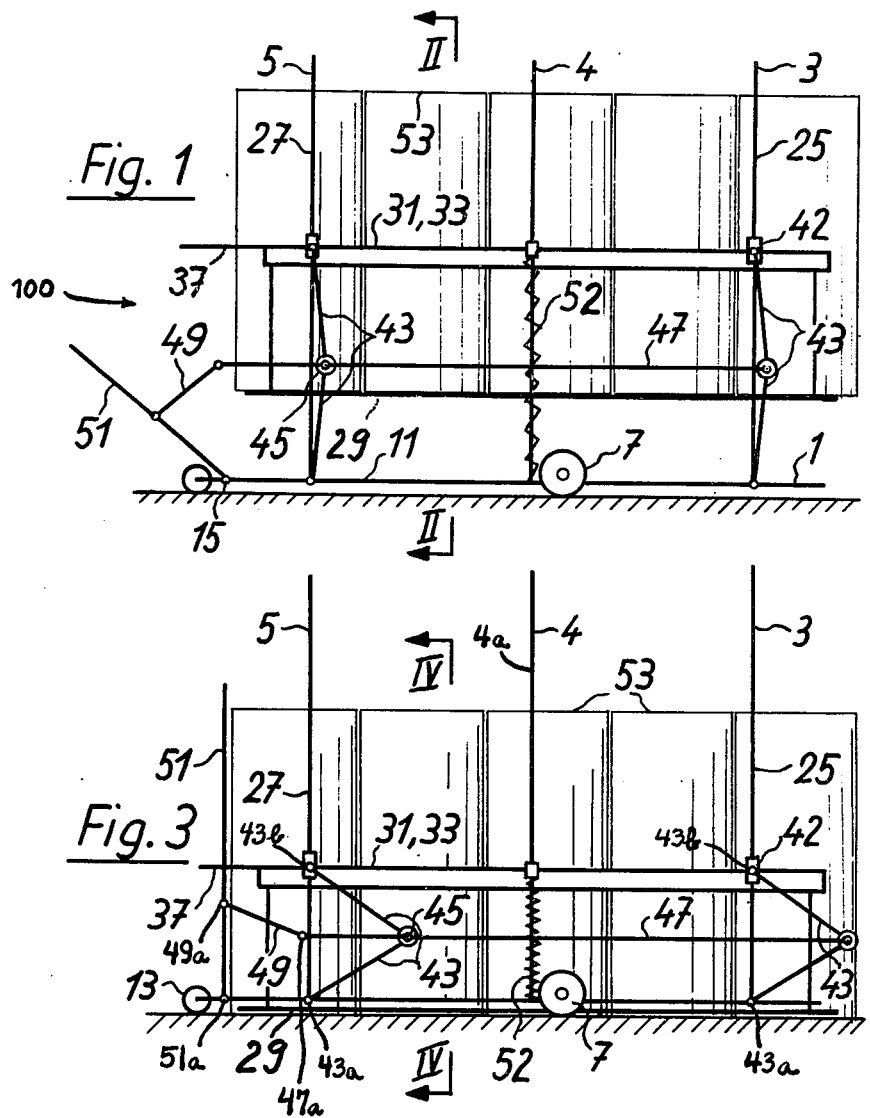

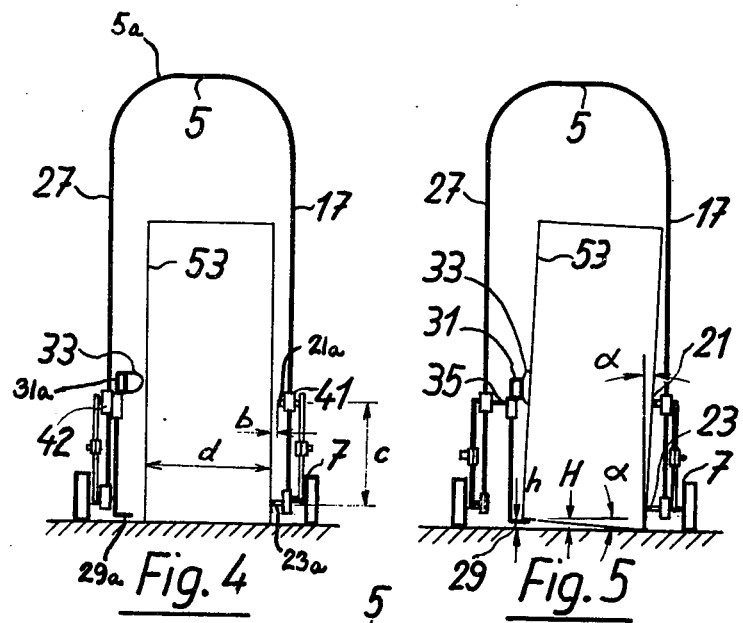
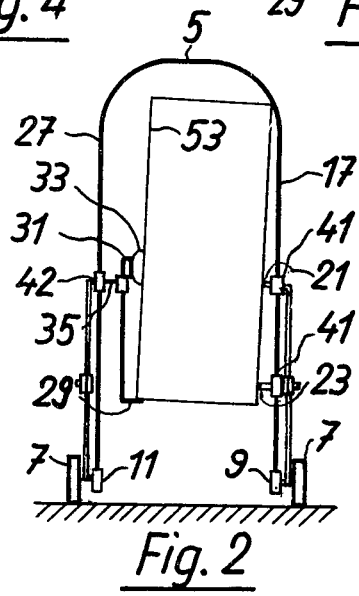

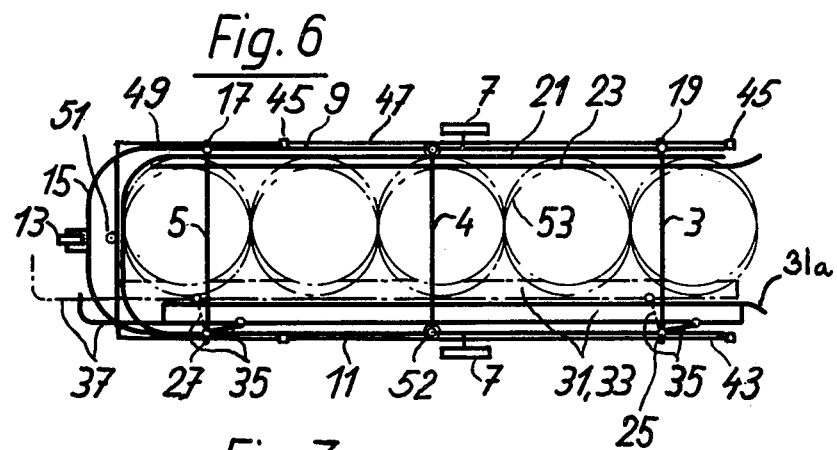
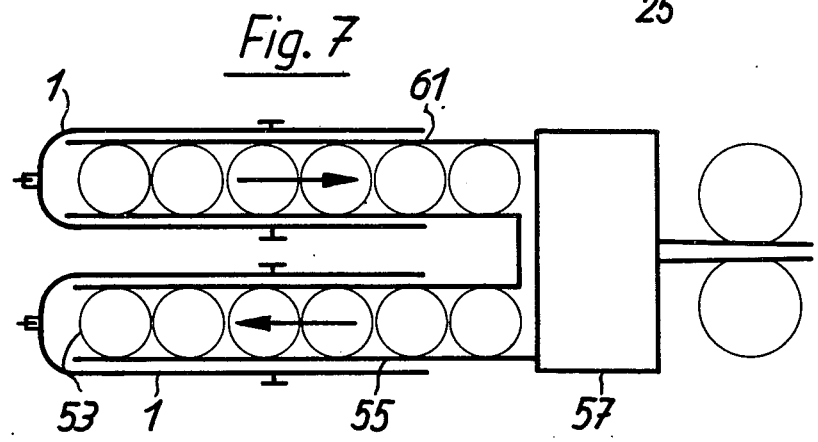
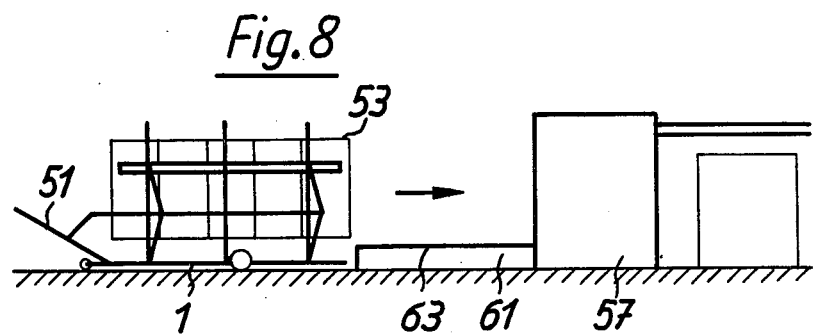

4,194,866

SLIVER CAN TRANSPORTING DOLLY

BACKGROUND OF THE INVENTION

The present invention relates to a new and improved construction of a sliver can transporting dolly or the like, sometimes referred to as a sliver can transporting trolley.

Heretofore sliver cans were usually transported on hand carts from a fiber sliver production machine, e.g. a drawframe or a card, to the fiber silver processing machine, e.g. an open-end spinning machine (also briefly referred to as an OE-spinning machine) or a roving frame. In the case of an open-end spining machine embodying, for instance, two hundred spinning positions, it was necessary that many times during the day two hundred full sliver cans had to be loaded at the fiber sliver production machines and again unloaded at the open-end spinning machine. This is equally true with regard to movement of the empty cans in the reverse sequence. As to the operating personnel this work is tedious and heavy.

Now as taught to the art from the commonly assigned, German patent publication No. 2,556,703, and the corresponding U.S. Pat. No. 4,059,185, granted Nov. 22, 1977, loading of the full cans upon the transporting dollies or trolleys is performed by a can loading device installed at the fiber silver production machine instead of by the manual effort of the machine operators. At the fiber silver processing machine, however, the cans are manually unloaded as heretofore.

Furthermore, in older spinning mill plants or buildings, frequently containing many internal support columns or other obstructions, such can loading devices oftentimes cannot be erected dur to the interference of such internal columns or obstructions. Also, automatic can loading devices may not be installed for cost considerations.

SUMMARY OF THE INVENTION

Therefore, with the foregoing in mind it is a primary object of the present invention to provide a new and improved construction of sliver can transporting dolly which overcomes the aforementioned drawbacks and shortcomings in this particular field of technology.

Another and more specific object of the present invention aims at providing a new and improved construction of sliver can transporting dolly which facilitates the aforementioned tedious work.

Still a further significant object of the present invention is to provide inexpensive and simply operated equipment for performing the aforementioned work.

A further object of the present invention is to provide a sliver can transporting dolly of relatively simple construction and design, affording production economies, and enabling utilization thereof even in structures where other can loading devices cannot be erected due to lack of adequate space or cost considerations.

Yet a further significant object of the present invention is to provide equipment of the aforementioned character which enables the operating pesonnel to simultaneously lift a plurality of cans, transport the same and set such down again at any desired location, with a minimum of effort.

Now in order to implement these and still further objects of the invention, which will become more readily apparent as the description proceeds, the invention contemplates providing a simple, inexpensive sliver can transporting dolly which is constructed such that it contains a base frame with substantially parallel longitudinally support beams. There is further provided mechanism for laterally tilting, gripping underneath and lifting cans standing between the longitudinal beams of the base frame.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a side view of a can transporting dolly shown loaded with cans or the like;

FIG. 2 is a sectional view, taken substantially along the line II—II of FIG. 1;

FIG. 3 is a side view of the transporting dolly of FIG. 1 in its unloaded state with the cans ready for loading;

FIG. 4 is a sectional view, taken substantially along the line IV—IV of FIG. 3;

FIG. 5 is a sectional view, taken substantially along the line IV—IV of FIG. 3, after tilting the cans;

FIG. 6 is a top plan view of the arrangement of FIG. 3, before and after (indicated with dash-dotted lines) tilting of the cans;

FIG. 7 is a top plan view of a sliver depositing device together with the transporting dollies or trolleys at the can input station and at the can output station; and FIG. 8 is a side view of the arrangement shown in FIG. 7.

DETAILED DESCRIPTION OF THE PREFERRED EMBODIMENTS

Describing now the drawings, the exemplary embodiment of transporting dolly or trolley, generally indicated in its entirety by reference character 100 in FIG. 1, will be seen to comprise a substantially U-shaped base frame 1 having rigidly mounted thereat three loop members 3, 4 and 5 which arch over the base frame 1. This U-shaped base frame 1 embodies a pair of substantially parallel, longitudinally extending support beams or legs 9 and 11 which are interconnected by a cross-member or traverse 15 or equivalent structure at the front of the base frame 1. Fixedly laterally mounted at each longitudinal support beam or leg 9 and 11 is a respective rotating wheel 7 and at the front of the transporting dolly 100 there is mounted at the cross-member or traverse 15 a pivotable revolving wheel 13, as best seen by referring to FIG. 3.

Each of the three loop members or curved brackets 3, 4 and 5 are provided with upstanding or vertically extending legs, and by referring to FIG. 6 it will be seen that on the vertical legs 17 and 19 of the outermost positioned loop members 5 and 3, and which vertical legs 17 and 19 are connected with the longitudinal support beam or leg 9, there are supported for vertically slidable movement in guide sleeves 41 two essentially parallel, superimposed and mutually connected back-holding or counter-holding elements, here shown in the form of back-holding or counter-holding bars or rods 21 and 23 which extend essentially horizontally. In the illustrated arrangement, the lower bar or rod member 23 is offset by a distance b towards the center or center line of the transporting dolly, there being valid the relationship $b > c \cdot \sin \alpha$, wherein the symbol c designates the distance between the back-holding bars or rods 21 and 23, and the angle α represents the tilting angle of the tilted sliver can 53 or other structure handled by such transporting dolly 100. The two back-holding bars 21 and 23 are preferably covered with rubber, as generally schematically indicated by reference characters 21a and 23a, respectively, in FIG. 4.

Now at the opposite legs 25 and 27 of the U-shaped loop members 3 and 5 there are also provided vertically shiftable, mutually interconnected and spaced bars or rods 29 and 31 which extend over approximately the full length of the base frame 1. The lower rod 29 constitutes a gripper or engagement rod, here shown formed by a flat profile or sectional member 29a, and the upper rod 31 defines a tilting rod, here shown formed by a rectangular profile or sectional member 31a (FIG. 4). A hollow rubber or elastomeric member 33 is mounted at the tilting rod 31. In the unloaded condition of the hollow rubber member 33 its dimension in the direction extending towards the center or center line of the trolley exceeds the dimension of the gripper or engagement rod 29, as best seen by referring to FIG. 4, whereas in its compressed state under load such dimension of the hollow rubber member 33 is substantially smaller than the dimension of the gripper or engagement rod 29, as best seen by referring to FIG. 5. In other words: the deformable member 33 in its unloaded state preferably has a width dimension extending towards the center line of the transporting dolly 100 which is greater than the width extent of the gripper or engagement rod 29 towards such center line, but then becomes smaller when the deformable member 33 is compressed under the load of the handled sliver cans 53.

By means of two pivotable arms 35 the two rods 29 and 31 are mounted to be pivotable in guide or pivoting sleeves 42 in an essentially horizontal plane, these guide or pivoting sleeves 42 being mounted on the legs 25 and 27 of the loop members or brackets 3 and 5 of the transporting dolly 100. Actuation of the pivoting arms 35 supported upon the guide sleeves 42 at the legs 25 and 27 is accomplished by means of a hand-operated actuation member, here in the form of a hand-operated actuation lever 37 arranged at the end of the transporting dolly 100, which end may be conveniently considered, as previously, as constituting the front end of the dolly, but obviously also could be termed the rear end depending upon whether the dolly is being pulled or pushed, i.e., its direction of travel.

The back-holding rod or bar 21 and the tilting rod or bar 31 are preferably curved towards the outside at the rear end of the transporting dolly 100.

Between the guide sleeves 41 and 42 and the support beams or legs 9 and 11 of the base frame 1 there are articulated in conventional manner can lifting and lowering means, here shown in the form of toggle levers 43. These toggle levers 43 are connected at the hinge locations 43a and 43b with the related longitudinal support beam 9, 11 and guide sleeve 41, 42, as indicated in FIG. 3 for the support beam 11 and the guide sleeves 42. Furthermore, the toggle levers 43 at each side of the transporting dolly 100 are mutually interconnected by means of a connecting rod 47, as best seen by referring to FIGS. 1 and 2. A further respective rod 49 at each side of the transporting dolly 100 is pivotably connected at the hinge means 47a with the related connecting rod 47 and at its other end it is connected at the hinge means or location 49a with a dolly pole or handle 51 or equivalent structure. The dolly pole 51 is pivotably mounted at the hinge or pivot location 51a on the cross-member or traverse 15 of the base frame 1.

A respective resilient element, here shown in the form of a helical spring 52 is provided between the base frame 1 and the guide sleeves 41 and 42 on the upstanding loop or bracket member 4.

Of course, it is not absolutely mandatory to interconnected the two support beams or legs 9 and 11 of the base frame 1 by means of the upper curved part of the loop members, specifically the loop members 3 and 5, and as indicated by the curved part 5a of the loop member or bracket 5 visible in the showing of FIG. 4. However, this construction affords increased stability for the transporting dolly 100 with lower weight, in comparison with an arrangement where the upstanding parts of the brackets are not interconnected into a loop which defines a U-shaped loop or bracket.

Now the loading and unloading of the transporting dollies 100 of the construction heretofore described can be accomplished as follows:

The operator pushes the transporting dolly 100, with the open-end of the base frame 1 leading, into a row of cans 53 standing upon the floor, at which time the dolly pole or handle 51 is essentially in its upright position as shown in FIG. 3. For this operation the cans 53 need only be approximately aligned in a row. Any slightly misaligned or offset positioned cans 53 are engaged by the outwardly bent ends of the tilting rod 31 and the back-holding rod 21 and are guided into the transporting trolley 100, i.e., into the region between the support beams 9 and 11 of the base frame 1. In FIG. 6 the outwardly bent portion or region of the tilting rod 31 has been shown and designated by reference character 31a. Once the transporting dolly 100 has been totally filed with cans 53, or even only partially filled with such cans, then the pivoting or pivotable arms or arm members 35 are rocked into their position indicated by dash-dotted or phantom lines in FIG. 6, by pulling-out the actuation lever 37. Owing to this pivoting movement the gripper or engagement rod 29 and the tilting rod 31 are moved towards the inside, i.e. in the direction of the center line of the transporting dolly 100. As a result, the cans 53 are initially pushed by the deformable rubber member 33 against the lower back-holding or counter-holding rod 23 and then are tilted over through an angle α against the upper back-holding or counter-holding rod 21. During this operation the bottom of each such tilted can 53 is raised through a height $H = d \cdot \sin \alpha$, wherein the symbol d represents the can diameter and the angle α, as previously mentioned, constitutes the angle of tilt of the cans 53 with respect to the vertical. The height H, with the embodiment under discussion, is selected such that it exceeds the height h of the gripper or engagement rod 29 above the floor or other support structure upon which the dolly moves. The rubber or elastomeric member 33 is compressed during such time as the cans 53 are tilted, and therefore, the gripper or engagement rod 29 is shifted beneath the underside or bottom of the cans 53 which have been appropriately lifted or tilted i.e., below the left-hand portion of the tilted cans 53 as shown in FIG. 5. Owing to the reduction of the cross-section of the deformable rubber member 33 the gripper or engagement rod 29 is correspondingly further shifted below the cans 53. The rods 29 and 31 remain fixed in this position. Now the operator pivots the dolly pole or handle 51 downwards. Due to this action the toggle-levers 43 are operated, i.e. extended, with the result that there is accomplished simultaneous upward movement of the rods 21 and 23 and the rods 29 and 31 along with the cans 53. Now in this position the transporting dolly 100 is ready for accomplishing its can transporting function.

Obviously, unloading of the cans 53 is accomplished in the reverse sequence of manual operations.

The above-description of the operation of the transporting dolly 100 has been given on the assumption that cans 53 are loaded which stand on the floor.

In practice, however, the cans are not always located at a floor, rather must be removed from another location, such as for instance at a drawframe. The drawframe can input station and can output station frequently are arranged at a height of 10 to 30 centimeters above the floor due to the arrangement of their drive mechanisms. In such cases, the transporting dolly 100 is inserted into the can output station 55 of a suitable sliver depositing device 57, as best seen by referring to FIGS. 7 and 8, while the dolly pole or handle 51 is partially lowered and the pivotable arms 35 are moved back. Thereafter, the tilting and further lifting of the cans 53 is carried out in the manner heretofore described.

By means of the helical springs 52 (FIGS. 1 and 3), which can be provided on the upright or upstanding legs 4a of the loop or bracket member 4, it is possible to store in a very convenient and easy manner lifting energy.

As best seen by referring to FIGS. 7 and 8, the heavy full cans are taken-up not from the floor proper, rather from a surface at the can output station 55 which is located above the floor. The remaining lift path is small and the force to be expended is likewise small (the toggle-levers 43 are practically extended). During unloading of the cans 53 the helical springs 52 are compressed by the weight of the full cans 53 as the dolly pole or handle 51 is pivoted-up. The energy which is thus gained is stored in the springs 52 and facilitates the subsequent lifting of the empty cans 53 from the floor. As the empty cans 53 are also deposited onto the elevated surface at the can input station 61 of the sliver depositing device 57, again a minimum amount of force is required during unloading the cans 53 onto this elevated level, indicated by reference character 63, of the can input station 61 for partially tensioning the springs 52, (the toggle-levers 43 almost being extended).

Of course, it is conceivable to consider other constructional embodiments; by means of which cans are first tilted, in such manner that a support rod can be shifted beneath the bottom ends of the cans such that the cans can then be subsequently lifted.

The can transporting dolly as proposed herein has a multitude of advantages, which, on the one hand, rationalizes transport of the cans or the like, and, on the other hand, appreciably facilitates the work of the operating personnel.

The simple and compact design allows for easy operation and movement of the transporting dolly 100. Maintenance is reduced to a minimum and can be handled by the operating personnel. Mechanical failures are highly unlikely since there are used neither electrical drives nor other drive mechanisms.

A further notable advantage resides in that the initial investment costs and the maintenance costs for the individual transporting dollies are extremely low. Any adaptations of the machine supplying the fiber sliver is of course optional and can be achieved with very little expense. Such measures just further facilitate the lifting of the full cans.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A sliver can transporting dolly comprising:
    a base frame;
    said base frame embodying a pair of spaced substantially parallel, longitudinally extending support beams structured to receive cans therebetween;
    means for laterally tilting and engaging with the underside of the tilted cans and for lifting cans standing between said longitudinal support beams of said base frame;
    said means for tilting, engaging and lifting the cans comprises:
        a first pair of back-holding rods;
        means for mounting said first pair of back-holding rods for substantially vertical movement;
        a second pair of rods, one of which rods defines a gripper rod for the cans and the other of which rods defines a tilting rod for the cans; and
        means for mounting said second pair of rods to be substantially horizontally and vertically movable.

2. The sliver can transporting dolly as defined in claim 1, further including:
    means for selectively raising and lowering said first and second pairs of rods.

3. The sliver can transporting dolly as defined in claim 1, wherein:
    said first pair of back-holding rods defines a lower back-holding rod and an upper back-holding rod;
    said lower back-holding rod being arranged offset with respect to the upper back-holding rod and closer towards the center of the dolly.

4. The sliver can transporting dolly as defined in claim 3, wherein:
    said lower back-holding rod is offset towards the center of the dolly by the distance $b > c \cdot \sin \alpha$ wherein b represents the offset distance between the lower back-holding rod and the upper back-holding rod with respect to the center of the dolly, c represents the spacing between the lower and upper back-holding rods, the $\alpha$ represents the angle of tilt of the tilted cans.

5. The sliver can transporting dolly as defined in claim 1, wherein:
    said tilting rod is arranged in offset relationship with respect to said gripper rod towards the center of the dolly.

6. The sliver can transporting dolly as defined in claim 5, wherein:
    said tilting rod is provided with a deformable rubber member arranged facing towards the center of the dolly.

7. The sliver can transporting dolly as defined in claim 1, wherein said means for tilting, engaging and lifting the cans comprises:
    mechanism for tilting the cans by conjointly pivoting said tilting rod and said gripper rod in a direction towards said first pair of back-holding rods.

8. The sliver can transporting dolly as defined in claim 1, wherein said means for tilting, engaging and lifting the cans comprises:
    toggle-lever means for simultaneously lifting and raising all of said rods vertically over the same lift distance.

* * * * *